US012035111B2

(12) United States Patent
Yang et al.

(10) Patent No.: US 12,035,111 B2
(45) Date of Patent: Jul. 9, 2024

(54) METHOD FOR PROVIDING VISUAL MARKINGS ON A CONNECTOR FOR A HEARING DEVICE

(71) Applicant: GN Hearing A/S, Ballerup (DK)

(72) Inventors: Qi Yang, Chicago, IL (US); Erin O'Neill, Northfield, MN (US); Christian Grønnegaard, Copenhagen (DK); Michalis Papakostas, Chicago, IL (US)

(73) Assignee: GN HEARING A/S, Ballerup (DK)

( * ) Notice: Subject to any disclaimer, the term of this patent is extended or adjusted under 35 U.S.C. 154(b) by 196 days.

(21) Appl. No.: 17/581,829

(22) Filed: Jan. 21, 2022

(65) Prior Publication Data

US 2023/0239636 A1 Jul. 27, 2023

(51) Int. Cl.
*H04R 25/00* (2006.01)

(52) U.S. Cl.
CPC ........... *H04R 25/607* (2019.05); *H04R 25/65* (2013.01); *H04R 2225/0216* (2019.05); *H04R 2225/025* (2013.01)

(58) Field of Classification Search
CPC ............ H04R 1/1016; H04R 2225/021; H04R 2225/0213; H04R 2225/0216; H04R 2225/025; H04R 2460/17
See application file for complete search history.

(56) References Cited

U.S. PATENT DOCUMENTS 4,827,525 A * 5/1989 Hotvet ................. H04R 25/604 381/60
6,105,715 A * 8/2000 Knauer ................... A61F 11/08 181/135
6,345,684 B1 * 2/2002 Leight ..................... A61F 11/08 181/135
(Continued)

FOREIGN PATENT DOCUMENTS

DE 102005058772 B3 * 3/2007 ........... H04R 25/652
DE 20023930 U1 * 10/2007 ............. H04R 25/65
(Continued)

OTHER PUBLICATIONS

Extended European Search Report for EP Patent Appln. No. 22164453.7 dated Sep. 19, 2022.
(Continued)

*Primary Examiner* — Ryan Robinson
(74) *Attorney, Agent, or Firm* — Vista IP Law Group, LLP

(57) ABSTRACT

A method of providing a custom visual marking on a earing device includes: providing a hearing device comprising a behind-the-ear (BTE) component, an in-the-ear (ITE) component, and a connector having a proximal end connected to the ITE component and a distal end connected to the BTE component, the connector comprising a flexible member extending between the proximal and distal ends; arranging the BTE component behind the ear of the user, and arranging the ITE component in the ear canal of the user so that the
(Continued)

connector has a covered portion inserted in the ear canal and an exposed portion outside the ear canal; and providing a visual marking on the connector, wherein the visual marking distinguishes the covered portion from the exposed portion. Further disclosed is a connector and a hearing device.

9 Claims, 6 Drawing Sheets

(56) References Cited

U.S. PATENT DOCUMENTS

| | | | | |
|---|---|---|---|---|
| 7,720,244 | B2 * | 5/2010 | Espersen | H04R 25/656<br>381/328 |
| 7,844,065 | B2 * | 11/2010 | von Dombrowski | H04R 25/48<br>381/328 |
| 8,357,084 | B2 * | 1/2013 | Bachler | A61B 1/227<br>600/184 |
| 8,411,889 | B2 * | 4/2013 | Naumann | H04R 25/00<br>381/328 |
| 8,550,206 | B2 * | 10/2013 | Keady | A61F 11/08<br>181/135 |
| 9,961,458 | B1 * | 5/2018 | Tourdot | H04R 25/602 |
| 10,051,383 | B2 * | 8/2018 | Margot | H04R 25/456 |
| 11,564,042 | B2 * | 1/2023 | Saidi | H04R 25/75 |
| 2009/0087006 | A1 * | 4/2009 | Leong | H04R 25/656<br>381/328 |
| 2011/0135131 | A1 * | 6/2011 | Winther | H04R 25/02<br>381/322 |
| 2012/0237068 | A1 * | 9/2012 | Fretz | H04R 25/656<br>381/330 |
| 2012/0257774 | A1 * | 10/2012 | Larsen | H04R 25/656<br>381/328 |
| 2013/0223666 | A1 * | 8/2013 | Michel | H04R 25/00<br>381/329 |
| 2013/0259279 | A1 * | 10/2013 | Hong | H04R 25/607<br>381/322 |
| 2014/0016808 | A1 * | 1/2014 | Cherukuri | H04R 25/652<br>381/324 |
| 2016/0166203 | A1 * | 6/2016 | Goldstein | A61B 5/02055<br>600/509 |
| 2016/0361203 | A1 * | 12/2016 | Khademhosseini | A61M 3/005 |
| 2022/0126028 | A1 * | 4/2022 | Sacherman | A61F 11/00 |
| 2022/0279294 | A1 * | 9/2022 | Xu | H04R 25/658 |
| 2023/0181886 | A1 * | 6/2023 | Zuur | A61M 5/46<br>604/73 |
| 2023/0236003 | A1 * | 7/2023 | Venkatakrishnan | G01B 5/18<br>33/512 |

FOREIGN PATENT DOCUMENTS

| | | | | | |
|---|---|---|---|---|---|
| DE | 202015007381 | U1 * | 3/2016 | A44C 15/00 |
| EP | 1755361 | A1 * | 2/2007 | H04R 25/00 |
| EP | 3422739 | A1 * | 1/2019 | |

OTHER PUBLICATIONS

Sullivan Roy: "A Simple and Expedient Method to Facilitate Receiver-inCanal (RIC) Non-custom Tip Insertion | The Hearing Review", Hearing Review. 2018; 25(3): 12-13., Mar. 5, 2018 (Mar. 5, 2018), pp. 1-8, XP055959641, Retrieved from the Internet: URL :https:/lhearingreview.com/hearing-products/accessories/earmolds-simple-expedient-method-facilitate-receiver-cana1-ric-non-custom-tip-insertion [retrieved on Sep. 12, 2022].

Anonymous: "Tube Twistsi Holographic Colour for Cochlear ImplanV hearing—Etsy UK", Oct. 1, 2021 (Oct. 1, 2021 ), pp. 1-13, XP055959676, Retrieved from the Internet: URL: https://www.etsy.com/uk/listing/1300978449/tube-twists-holographiccolour-for?ga_order=most_relevant&ga_search_type=all&ga_view_type=gallery&ga_search_ query=hearing+aid+charms+RIC&ref=sr_gallery-1-7&sts= 1&organicsearch_click=1 [etrieved on Sep. 12, 2022].

Anonymous: "Brighter is better for hearing aid 'jewellery'", Jeweller Magazine: Jewellery News and Trends, Sep. 18, 2012 (Sep. 18, 2012), pp. 1-2, XP055959694, Retrieved from the Internet: URL:https://www.jewellermagazine.com/Article/2702/8righter-is-better-for-hearing-aid-jewellery [retrieved on Sep. 1, 2022 21.

* cited by examiner

106

500
108

106
400

100
200
130
300

METHOD FOR PROVIDING VISUAL MARKINGS ON A CONNECTOR FOR A HEARING DEVICE

FIELD

The present disclosure relates to a method for providing a visual marking on a connector for connecting a behind the ear component and an in the ear component of a hearing device. The present disclosure further relates to a connector for connecting a behind the ear component and an in the ear component of a hearing, wherein the connector comprises removable visual markings, and to a hearing device comprising such a connector.

BACKGROUND

One of the more common form factors for hearing devices, such as hearing aids, comprise a behind the ear (BTE) component, an in the ear (ITE) component, and a connector connecting the BTE- and ITE-components. Insertion of the ITE component into the ear canal is typically challenging for new hearing device users. It is difficult, especially for inexperienced users, to estimate the correct insertion depth of the ITE component, a factor that directly impacts the accuracy of insertion gain and therefore quality of sound and the amplification benefit that a hearing device can provide to its wearer. Thus, there is a need to provide users with guidance in order to ensure that the hearing device is arranged correctly.

SUMMARY

It is an object to provide the hearing device user with guidance for the user, when the user is arranging the hearing device in its operational position, particularly when the user is inserting the ITE component in the ear canal, so that the correct insertion depth is achieved.

In a first aspect, this is accomplished by a method for custom marking a hearing device for a user, the method comprising the steps of: providing a hearing device comprising a behind the ear (BTE) component, an in the ear (ITE) component, and a connector having a proximal end connected to the ITE component and a distal end adapted to be connected to the BTE component, the connector comprising a flexible member extending between the proximal end and the distal end, the flexible member having a length, arranging the BTE component behind the ear of the user, and arranging the ITE component in the ear canal of the user at an insertion depth depending on the user's physiology so that the connector has a covered portion inserted in the ear canal and an exposed portion outside the ear canal, wherein the method further comprises the step of providing a visual marking on the connector, wherein the visual marking distinguishes the covered portion from the exposed portion.

In a second aspect, this is accomplished by a connector for a hearing aid comprising a behind the ear (BTE) component adapted to be arranged behind the ear of the user and an in the ear (ITE) component adapted to be arranged in the ear canal of the user, the connector comprising a proximal end adapted to be connected to the ITE component, a distal end adapted to be connected to the BTE component, and a flexible member extending between the proximal end and the distal end, the flexible member having a length, wherein the connector further comprises removable visual markings arranged along at least a part of the length of the flexible member.

In a third aspect, this is accomplished by a hearing device comprising a behind the ear (BTE) component adapted to be arranged behind the ear of the user, an in the ear (ITE) component adapted to be arranged in the ear canal of the user, and a connector according to the second aspect.

It is an advantage of these aspects that an individual user may have the connector of the hearing device customized with a visual marking, wherein the visual marking visually marks the portion of the connection member which should be inserted into the ear canal for the user to achieve the correct insertion depth for the ITE component.

For hearing devices such as hearing aids, the most common procedure when the user is acquiring a new device is that they will consult a hearing care professional (HCP) such as an audiologist, who will custom fit the device to the user's needs. This involves fitting the hearing device, wherein fitting is the term used for customizing settings such as gain and compression settings according to the user's particular hearing loss in specific frequency bands so that the hearing aid electronics may process captured or streamed audio to compensate for the user's hearing loss.

The initial process also requires that the correct hardware is chosen for the user. This may be choosing an ITE component with a receiver, i.e., the term used for the loudspeaker, capable of producing the sound pressure needed to compensate for the user's hearing loss, but it also requires choosing a connector with the correct length according to the user's physiology, i.e., the shape of the user's outer ear and ear canal, so that the connector can connect the BTE and ITE components, and so that the ITE component can reach the correct insertion depth. It is envisaged that this process may involve the method described herein so that the hearing care professional may customize the connector with a visual marking for the individual user, whereby the user subsequently may use the visual marking to assist them when inserting the ITE component in the ear canal and achieve the correct insertion depth without the need for human assistance.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
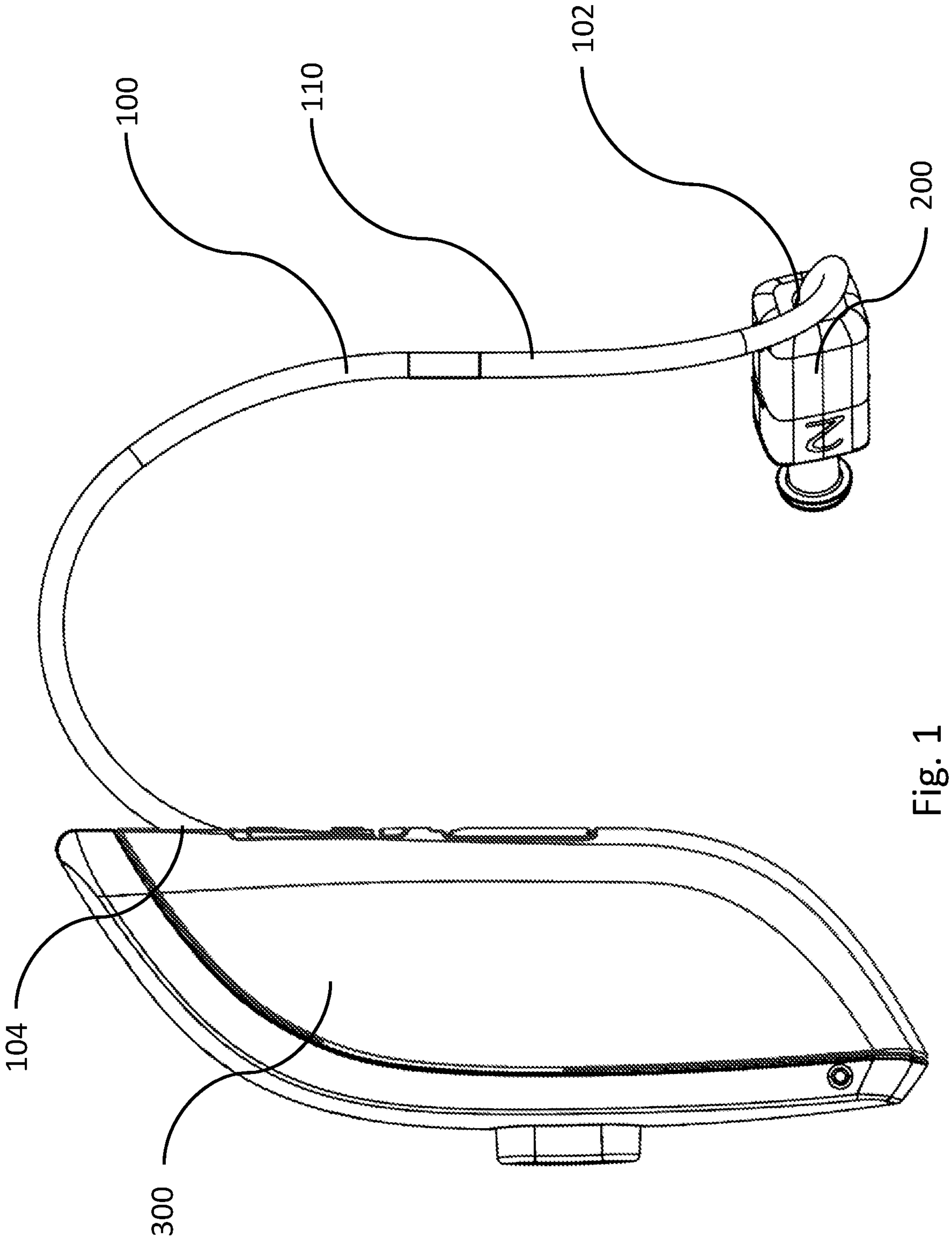
FIG. 1 shows a schematic drawing of a hearing device according to some embodiments.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The hearing device may be a hearing aid. The hearing device may be a Behind-the-Ear (BTE) hearing device, a Receiver-in-Ear (RIE) hearing device, or Microphone-and-Receiver-in-Ear (MaRIE) hearing device. These devices comprise a behind the ear (BTE) component configured to be worn behind the ear of the user and an in the ear (ITE) component configured to be inserted into the user's ear canal. Generally, the BTE component may comprise at least one input transducer, a power source, and a processing unit. It is noted that the term BTE hearing device is not to be confused with the term BTE component. The term BTE hearing device refers to a hearing device where the receiver, i.e., the output transducer, is comprised in the BTE component and sound is guided to the ITE component via a sound tube, i.e., the connector for a BTE hearing device, connecting the BTE and ITE components, whereas the terms RIE and MaRIE devices refer to hearing devices where the receiver is comprised in the ITE component, which is coupled to the BTE component via a connector configured for transferring electric signals between the BTE and ITE components.

In an embodiment, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz.

The second frequency may be between 9 MHz and 15 MHz.

In an embodiment, the hearing device may comprise one or more wireless communication unit(s). The one or more wireless communication unit(s) may comprise one or more wireless receiver(s), one or more wireless transmitter(s), one or more transmitter-receiver pair(s), and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g., enabling the user to listen to media, such as music or radio, and/or enabling the user to perform phone calls.

In an embodiment, the wireless signal may originate from one or more external source(s) and/or external devices, such as spouse microphone device(s), wireless audio transmitter(s), smart computer(s), and/or distributed microphone array(s) associated with a wireless transmitter. The wireless input signal(s) may origin from another hearing device, e.g., as part of a binaural hearing system, and/or from one or more accessory device(s), such as a smartphone and/or a smart watch.

In an embodiment, the hearing device may include a processing unit. The processing unit may be configured for processing the first and/or second input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment, fade balancing, and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second input signal(s). The processing unit may be configured to provide a second electric output signal. The second electric output signal may be based on the processing of the first and/or second input signal(s).

In an embodiment, the hearing device may comprise an output transducer. The output transducer may be coupled to the processing unit. The output transducer may be a receiver. It is noted that in this context, a receiver is the term used for a loudspeaker, whereas a wireless receiver is a device configured for processing a wireless signal. The receiver may be configured for converting the first electric output signal into an acoustic output signal. The output transducer may be coupled the processing unit via the magnetic antenna. The output transducer may be comprised in an ITE component or in a BTE component, of the hearing device. One or more of the input transducer(s) may be comprised in an ITE component.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas. In an embodiment, the hearing device may comprise a digital-to-analogue converter configured to convert the first electric output signal, the second electric output signal, and/or the wireless output signal into an analogue signal.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The connector may be configured to be releasably connected to the BTE component and/or the ITE component. By "releasably connected" it is meant that the connector may comprise an interface with attachment means adapted to mate with complementary attachment means on the BTE component and/or on the ITE component and it is intended that a user or HCP may release the connection without the use of excessive force. The connector may be configured to be non-releasably connected to the BTE component and/or the ITE component. By "non-releasably connected" it is meant that the connector is connected to the BTE component and/or ITE component with attachment means that require specialized tools and/or excessive force to detach. Examples of non-releasable connections are soldering, glue, welding, or that the connector is integrated, i.e., at least partly made from the same material, with the BTE component and/or the ITE component.

The connector may comprise removable visual markings arranged along at least a part of the length of the flexible member. The step of providing the visual marking may comprise removing a portion of the removable visual markings, wherein the portion of the removable visual markings is removed from the exposed portion, the covered portion, or between the exposed and the covered portions. Alternatively, the step of providing the visual marking may comprise adding a visible color to the flexible member. Thus, the method may be carried out by providing visual markings on a regular connector without premade removable visual markings or by providing a connecter according to some embodiments provided with removable visual markings.

The removable visual markings may comprise a dye. The dye may be coated on the flexible member. The dye may be comprised in the flexible member. The step of removing the removable visual markings may comprise curing the dye on the exposed portion, the covered portion, or between the exposed and the covered portions. The term curing is used for the process of altering or removing the color of the dye, whereby a clear visual distinction between cured dye and the un-cured dye is provided. In a preferred embodiment, the step of removing the removable visual markings comprises curing the dye on the exposed portion. This will provide a clear visible distinction between the covered and exposed portions as the covered portion will have the color of the un-cured dye while the exposed portion will have another or no color. The dye may be a highly visible color (e.g., Red, Blue) before curing. The dye may be configured to turn transparent or closer to skin-tone color upon curing. Alternatively, the flexible member may be of a first material which has a first color. The first material may be configured to change color to a second color or to turn transparent or translucent upon curing, so that the removable visual markings may be provided by the first material.

The flexible member may be skin tone colored, transparent, or translucent, i.e., capable of allowing light with a wavelength between 380 to 700 nanometers to pass through. This is advantageous as the portion of the flexible member where the removable visual markings are removed, preferably the exposed portion of the flexible member, will be skin tone colored, transparent, or translucent, which will make that portion discrete and inconspicuous. This is particularly advantageous in embodiments where the removable visual markings are removed from the exposed portion, i.e., the exposed portion will be skin tone colored, transparent, or translucent after the step of removing a portion of the removable visual markings, because the exposed portion will be visible during use. By having a transparent, translucent, or alternatively skin-tone exposed portion of the flexible member the connector will be more discrete which is highly desirable for some users. Meanwhile, the covered portion may have the color of the visual marking, whereby the user, when placing the hearing device in its operational position, may insert the ITE component into the ear canal to an insertion depth where the visual markings are no longer visible. The user may as an example use a mirror or a smartphone with a camera to perform the visual inspection during or after insertion. Because the covered portion is hidden during use, it is not a requirement that it is of a discrete or no color unlike the exposed portion.

The dye and/or the first material may be configured for curing by exposure to light at a first wavelength. The first wavelength may be shorter than 380 nanometers, such as UV light, or longer than 700 nanometers, such as infrared. It is noted that the first frequency mention above is not related to the first wavelength. The dye and/or the first material may be configured to be stable when exposed to light with wavelengths between 380 nanometers and 700 nanometers. This is advantageous because the dye will retain its color substantially when exposed to visible light, while also being easy to cure by exposing it to light at UV or infrared wavelengths, which can be done using handheld devices without harm to either the user or the hearing care professional.

Likewise, the step of removing the removable visible markings may comprise curing the dye and/or the first material by exposing the portion of the removable visual markings on the exposed portion to light with the first wavelength. This provides a method for providing the visual marking which can be done simply and safely by a hearing care professional, an audiologist, or another healthcare professional, where the hearing device is placed in its operational position so that the ITE component is inserted at the correct insertion depth, whereby the covered portion is also inside the ear canal while the exposed portion is outside the ear canal. Then, the exposed dye and/or first material of the exposed portion may be cured by exposure to light at the first wavelength, while the dye and/or first material of the covered portion remains unexposed as it is covered in the ear canal.

The dye and/or the first material may be configured for curing by exposure to one or more of the following curing agents: heat, chemicals, electric current, magnetic fields, and particle radiation, such as ions, plasma, and/or electrons. Likewise, the step of removing the removable visible markings may comprise curing the dye and/or the first material by exposing the exposed portion to one or more of the following curing agents: heat, chemicals, electric current, magnetic fields, and particle radiation, such as ions, plasma, and/or electrons.

The removable visual markings may comprise ink, the ink being of a visible color. The step of removing the removable visual markings may comprise exposing the ink on the exposed portion, the covered portion, or between the exposed and the covered portions to a chemical adapted to remove the ink or change/remove the color of the ink. Hereby a visual marking it provided which distinguishes the exposed portion from the covered portion by providing either the exposed portion, the covered portion, or the transition between the covered portion and the exposed portion with a visible color which may be used by the user as a guide when inserting the ITE component on their own.

The removable visual markings may comprise multiple removable colored bands. The step of removing the removable visual markings may comprise removing the removable colored bands from the exposed portion, the covered portion, or between the exposed and the covered portions. Hereby a visual marking it provided which distinguishes the exposed portion from the covered portion by providing either the exposed portion, the covered portion, or the transition between the covered portion and the exposed portion with a visible color which may be used by the user as a guide when inserting the ITE component on their own.

The step of providing the visual marking may comprise adding a visible color by adding an ink to the exposed portion, to the covered portion, or between the exposed and the covered portions. The step of providing the visual marking may comprise adding a colored sticker to the exposed portion, to the covered portion, or between the exposed and the covered portions. This provides a bottom-up approach to providing the visual marking where a hearing care professional or similar can add ink and/or a colored sticker to a connector which has not been provided with removable visual markings by the manufacturer. Thus, by providing either the exposed portion, the covered portion, or the transition between the covered portion and the exposed portion with a visible color, a visual marking which distinguishes the exposed portion from the covered portion is provided, and which may be used by the user as a guide when inserting the ITE component on their own.

Figure 2:
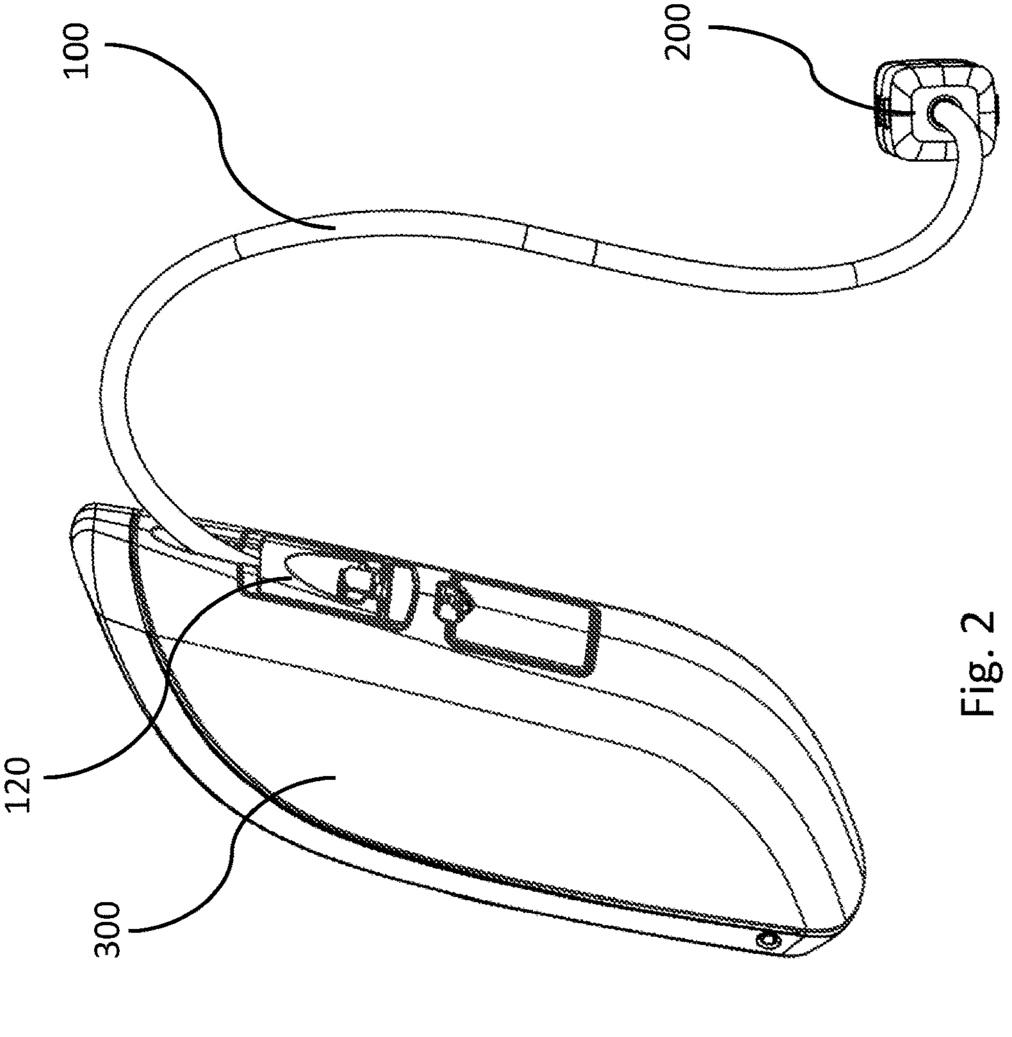
FIG. 2 shows a schematic drawing of a hearing device according to some embodiments.

FIGS. 1 and 2 show a hearing device from different angles. The hearing device comprises a BTE module 300 adapted to be worn behind the pinna of the ear 400 of a user, an ITE component 200 adapted to be inserted into the ear canal of a user, and a connector 100 connecting the BTE component 300 and the ITE component 200. The shown hearing device is of the receiver in ear (RIE) type. In RIE hearing devices the ITE component 200 comprises an output transducer, i.e., the receiver, adapted to provide an acoustic output signal to the user.

The BTE component 300 comprises at least one input transducer adapted to capture ambient audio and provide an electric input signal representing the captured audio. The BTE component 300 further comprises a signal processing unit adapted to provide an electric output signal based on the electric input signal. This may comprise applying gain and compression in one or more frequency bands in accordance with a hearing loss of the user so that the electric output signal is compensated for the hearing loss of the user. To transfer the electric output signal to the output transducer, the connector 100 comprises one or more electrical conductors adapted to provide an electrical connection between the BTE component 300 and the ITE component 200.

Figure 3:
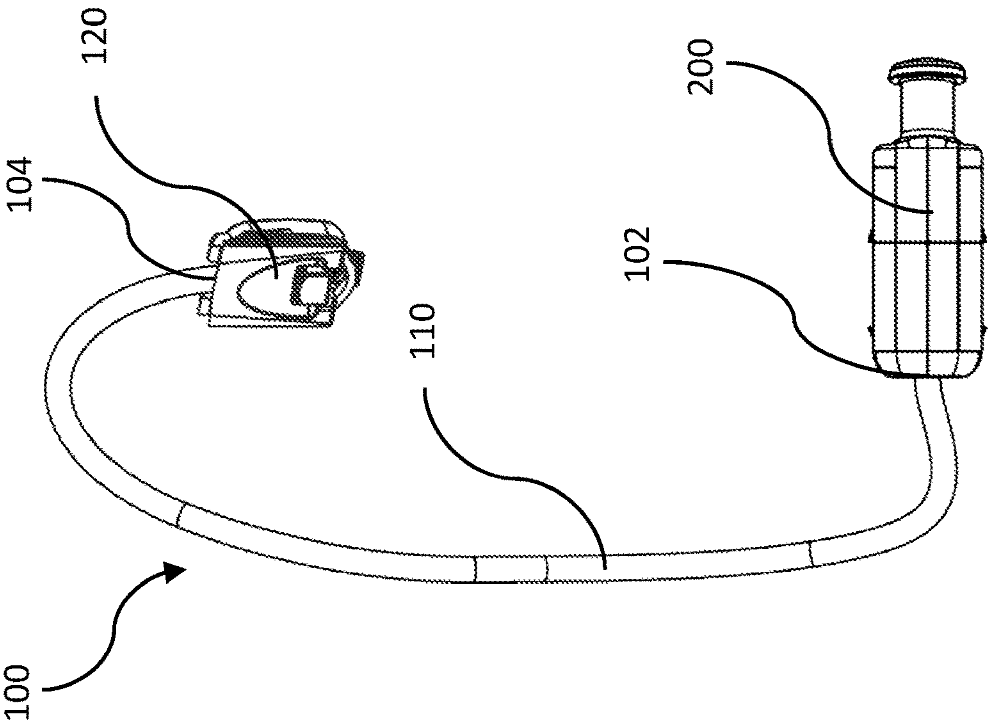
FIG. 3 shows a schematic drawing of a connector and ITE component according to some embodiments.

FIG. 3 shows a connector 100 and an ITE component 200. The connector 100 is connected to the ITE component 200 at a proximal end 102 of the connector 100. At a distal end 104 of the connector 100 the connector comprises an electro-mechanical BTE/Connector interface 120 adapted to be attached to a BTE component 300 and provide an electrical connection between the BTE component 300 and the one or more electrical conductors extending inside the connector 100. The connector 100 comprises a flexible member 110 extending between the proximal end 102 and the distal end 104 so that the flexible member 110 has a length. When the ITE component 200 is inserted into an ear canal of a user, a portion of this length will be inside the ear canal, i.e., the portion termed the covered portion 106, while the remaining portion of the length will be outside the ear canal i.e., the portion termed the exposed portion 108.

According to some embodiments, a visual marking may be provided to provide a visual distinction between the covered portion 106 and the exposed portion 108. This may be accomplished by providing the covered portion 106 and the exposed portion 108 in different colors, e.g., making the covered portion 106 in a bright, highly visible color and the exposed portion 108 transparent, or provide a colored visual marking at the boundary between the covered 106 portion and the exposed portion 108. Thereby, the user will be able to visually inspect whether they've inserted the ITE component 200 too shallow or to the right insertion depth in the ear canal by looking for the visual marking, e.g., by looking at a mirror or using a smartphone with a camera.

Figure 4:
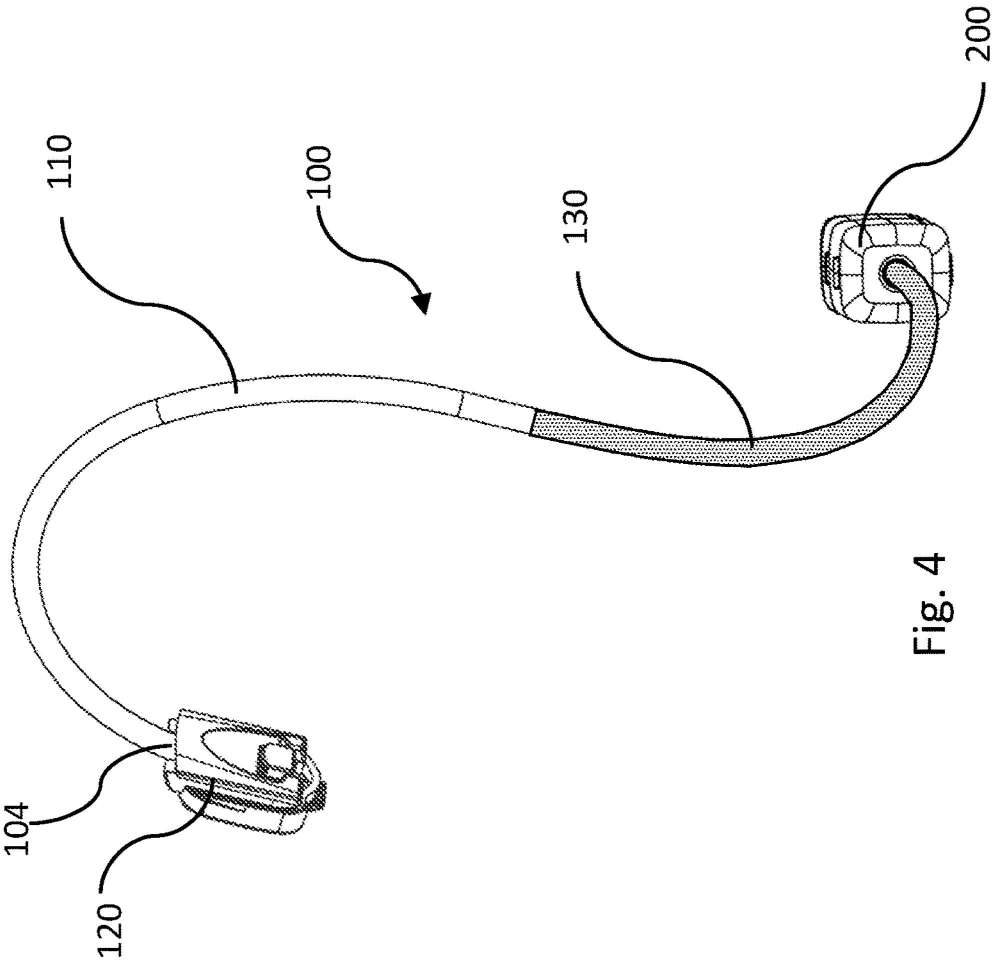
FIG. 4 shows a schematic drawing of a connector and ITE component according to some embodiments.

FIG. 4 shows a connector 100 according to some embodiments. The connector 100 comprises removable visible markings 130 arranged along a portion of the length from the proximal end 102 towards the distal end 104. In the shown embodiment the portion of the length provided with removable visual markings is approximately one third of the length of the flexible member 110 but it could be more or less, even covering the full length of the flexible member 110. In the shown embodiment the removable visual markings 130 are provided by a dye coated onto the flexible member 110. The dye may also be incorporated into the material from which the flexible member 110 in made or the material itself may have a color which can be removed/changed by curing.

The dye used to provide the removable visual markings 130 is substantially stable when exposed to light at wavelengths between 380 nanometers and 700 nanometers so that it does not cure/bleach when exposed to sunlight. It is noted that even stable dyes may bleach if exposed to direct sunlight for prolonged periods of time, which is why the dye is described as substantially stable above. The dye used to provide the removable visual markings 130 has the property that it bleaches when exposed to light at a first wavelength, the first wavelength preferably being in the UV or infrared ranges. Hereby, the dye can be easily cured by a hearing care professional by radiating the exposed portion with light at the first wavelength. Additionally, the dye won't spontaneously cure if exposed to light in the visible spectrum as it is photostable at these wavelengths.

The dye used to provide the removable visual markings 130 preferably has a highly visual color, such a red, before curing. The dye used to provide the removable visual markings 130 is preferably transparent, colorless, or translucent after curing. The flexible member 110 is preferably made from a transparent, colorless, or translucent material. Thereby, the dye left on the covered portion 106 after curing, will provide a clearly visible visual marking which clearly distinguishes the covered portion 106 from the exposed portion 108, so that the user can use the color left on the covered portion 106 as a visual guide on how much of the connector 100 should go into the ear canal, which in turn ensures that the correct insertion depth for the ITE component 200 is achieved.

Figure 5:
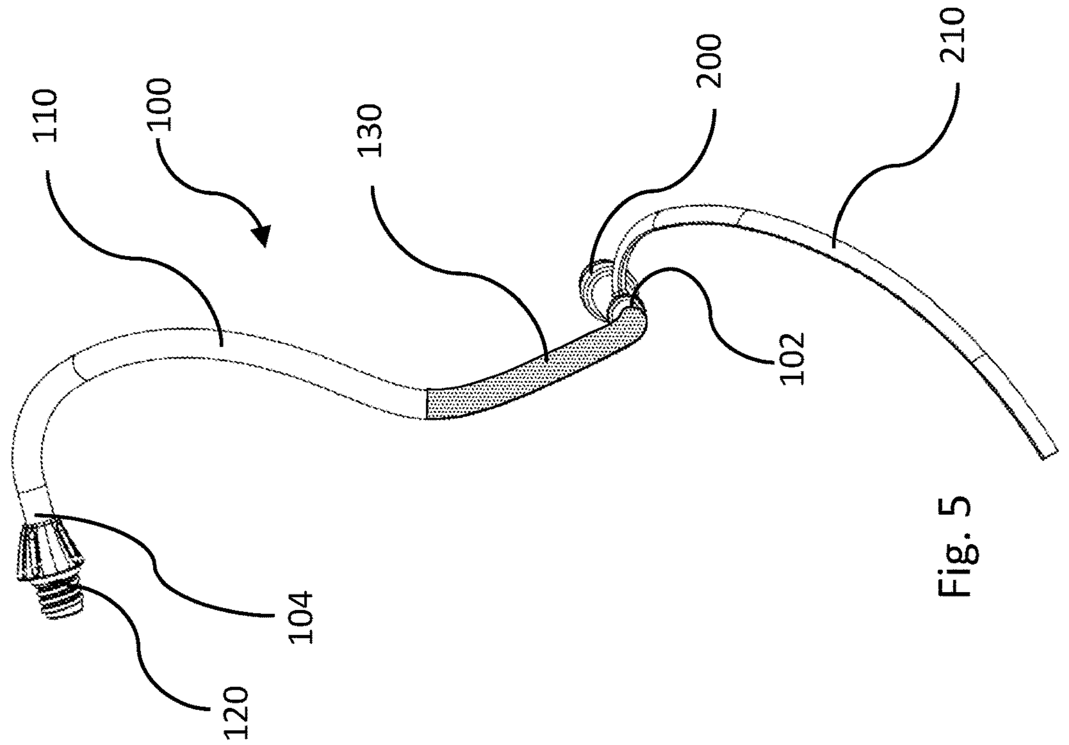
FIG. 5 shows a schematic drawing of a connector and ITE component according to some embodiments.

FIG. 5 shows a connector 100 according to some embodiments similar to the one shown in FIG. 4. The difference is that the connector shown in FIG. 5, is configured for use with a BTE hearing device, i.e., a hearing device where the output transducer is arranged in the BTE component 300. The flexible member 110 is shaped like a hollow tube so that sound can be guided from the BTE component 300 to the ITE component 200 in the user's ear 400. The BTE/Connector interface 120 is provided by attachment means, in the shown embodiment a thread adapted to be screwed into a corresponding thread in the BTE component 300. Optionally, the ITE component 200 comprises a securing element

210 adapted to abut the inside of the user's pinna so that the ITE component 200 is held in place during use.

Figures 6A, 6B, 6C, 6D, 6E:
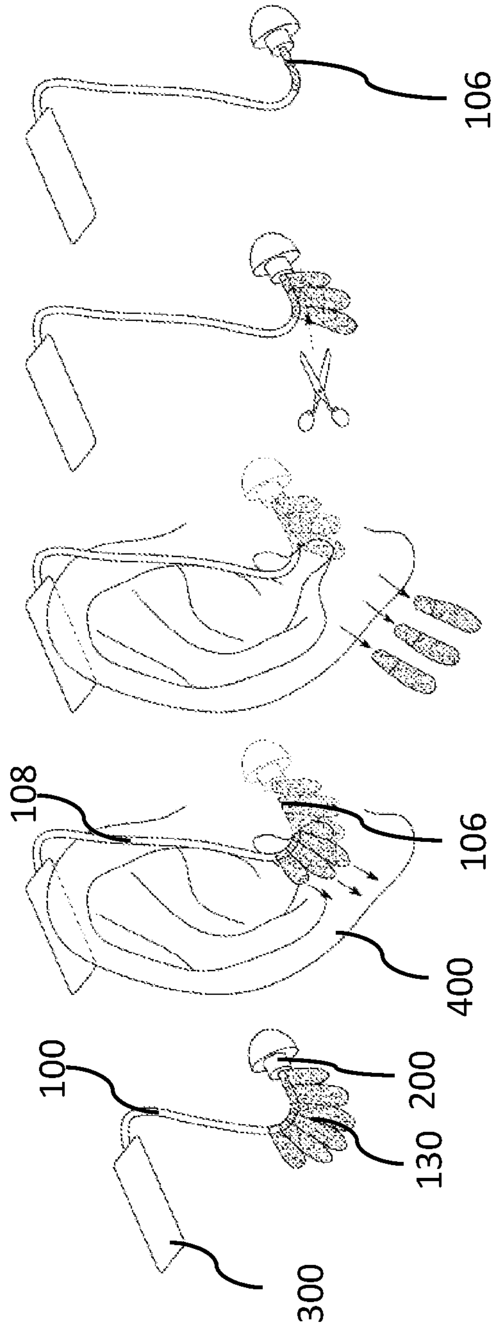
FIGS. 6*a-e* show the steps of carrying out a method according to some embodiments.

FIGS. 6*a-e* illustrate the steps of a method according to some embodiments. FIG. 6*a* shows a hearing device comprising a connector 100 according to some embodiments. The shown connector 100 comprises removable visual markings 130 provided by colored bands that can be removed easily by hand divided into removeable segments (for example, every 10th of an inch) arranged starting from the proximal end 102 along at least a part of the length of the flexible member 110 towards the distal end 104. Each of the colored bands may comprise a perforated zone at the flexible member 110 to facilitate removal of the respective colored band on the exposed portion 108. Each of the colored bands may comprise a tap extending outwards from the flexible member 110 to provide a griping surface so that colored bands on the exposed portion 108 can easily be torn off.

The colored bands may be flexible and may have a minor footprint so as not to impede ideal insertion at first fitting. After achieving a good fit during an initial fitting session, the hearing care professional (HCP) can remove the segments of the colored bands by pulling on the tabs, exposing the original color of the connector 100 (transparent, translucent, or skin-tone). This way the HCP can customize the visual marking as an insertion guide for the specific user. For example, the HCP can leave colored bands on only for the covered portion 106 of the connector 100, while removing the rest. If properly inserted the user should not see the remaining colored bands from outside. If colored bands are visible to the user, it is an indication that the insertion is not deep enough.

FIG. 6*b* shows a hearing device according to some embodiments arranged at and in the ear 400 of a user. When the ITE component 200 is inserted to the right insertion depth, the covered portion 106 of the connector 100 will be inside the ear canal while the exposed portion 108 will be outside the user's ear 400. Once the exposed portion 108 of the connector 100 has been determined, the removable visual markings 130 on the exposed portion 108 may be removed. In the shown embodiment, this step comprises removing the colored bands from the exposed portion 108, while leaving the colored bands on the covered portion 106 as shown in FIG. 6*c*.

FIG. 6*d* shows the removal of the taps on the colored bands on the covered portion 106 so that they won't irritate the user when the hearing device is worn in the future. FIG. 6*e* shows the final result, where the covered portion 106 has been provided with a visual marking making the covered portion 106 easily distinguishable from the exposed portion 108. The user may use the colored marking as guidance, when inserting the ITE component 200 unassisted by a hearing care professional, by inserting the ITE component 200 into the ear canal until the visual marking can no longer be seen.

Figures 7A, 7B, 7C, 7D:
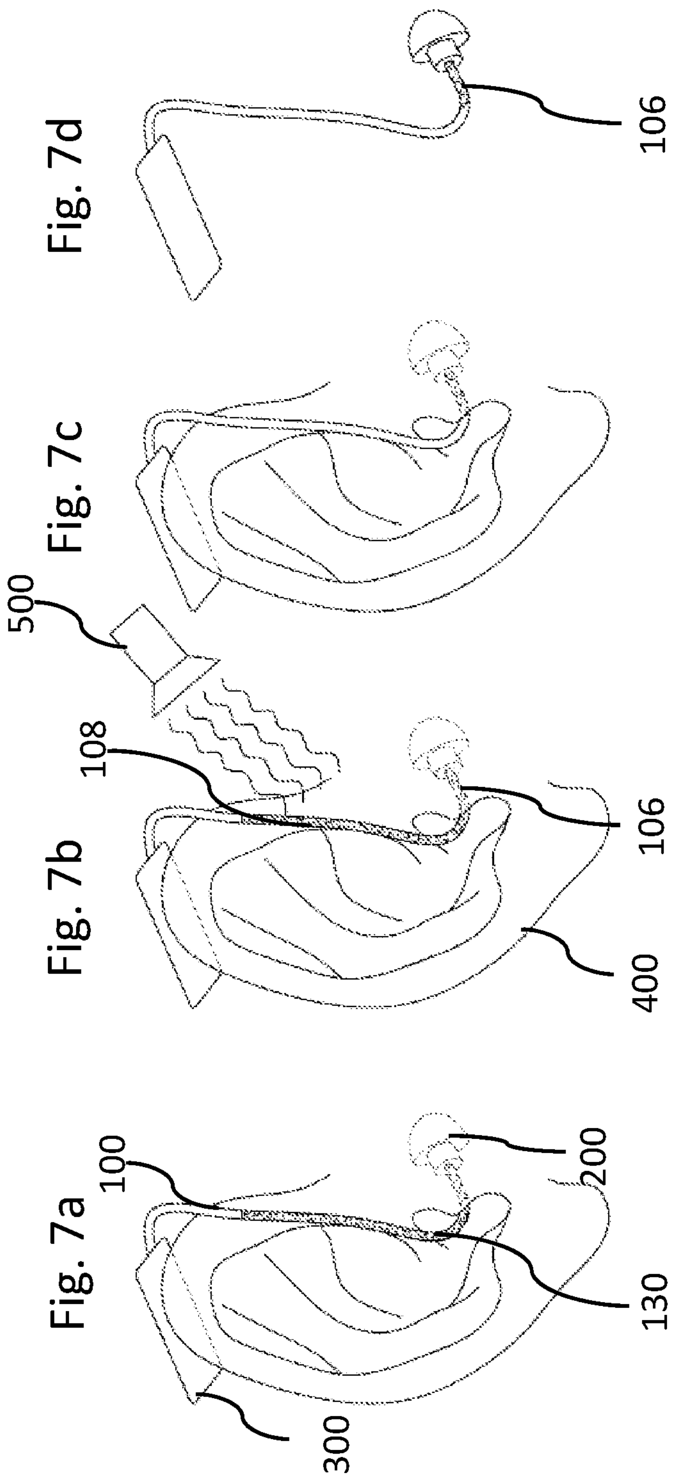
FIGS. 7*a-d* show the steps of carrying out a method according to some embodiments.

FIGS. 7*a-d* illustrate the steps of a method according to some embodiments. The hearing device shown in FIGS. 7*a-d* comprise a connector 100 similar to the one shown in FIG. 4, wherein the connector 100 comprises removable visual markings 130 provided by a dye coated onto at least part of the length of the flexible member 110. In FIG. 7*a* the hearing device is arranged in its operational position, wherein the BTE component 300 is arranged behind the ear 400 of the user and the ITE component 200 is arranged at an insertion depth in the ear canal whereby the connector 100 has a covered portion 106 in the ear canal and an exposed portion outside the ear 400.

FIG. 7*b* shows the step of removing the part of the removable visual markings 130 on the exposed portion 108 by curing the dye on the exposed portion 108. The curing process is done by radiating light at the first wavelength on the connector 100 so that the dye on the exposed portion 108 is exposed to the light so that the dye on the exposed portion 108 is cured, while the dye on the covered portion 106 is not exposed to the light so that it is not cured and retains its color. The light may be provided by a handheld light source 400, such as a UV source or infrared source depending on which wavelength the dye is configured to be cured at.

Figure 8A:
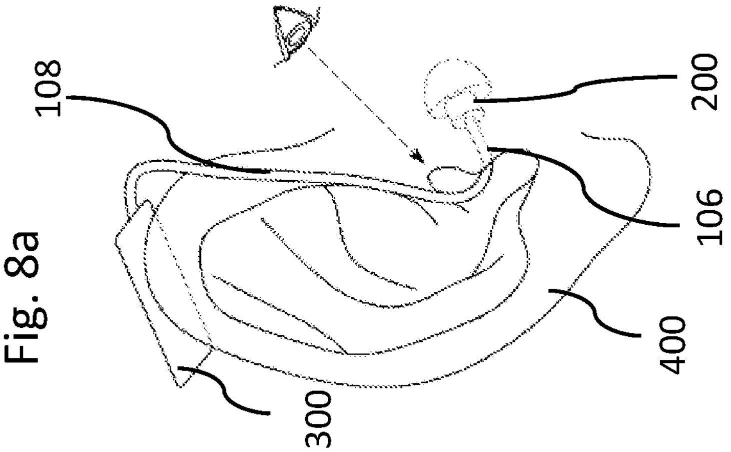
FIGS. 8*a-c* show the steps of carrying out a method according to some embodiments.
Figure 8B:
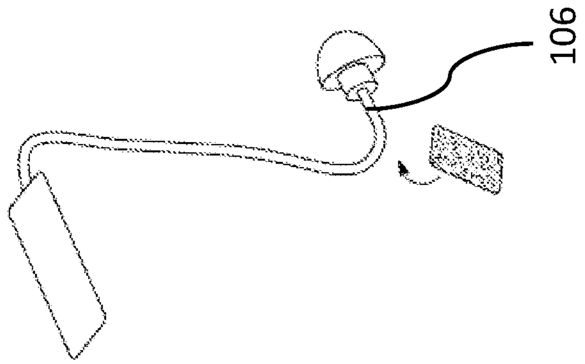
Figure 8C:
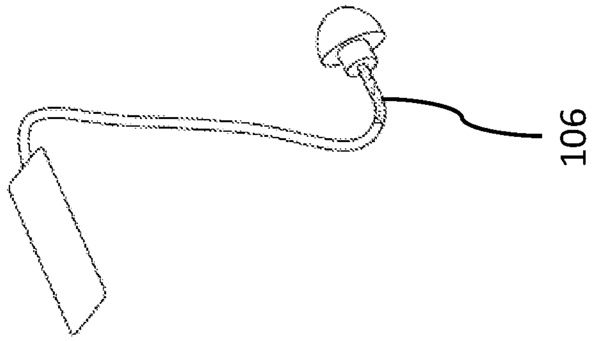

FIGS. 7*c-d* shows the result after the curing process, where the removable visual markings 130 on the exposed portion 108 has been removed, while the removable visual markings 130 on the covered portion 106 remains. Hereby, a visual marking which provides a visual distinction between the covered portion 106 and the exposed portion 108 is provided. The user may use the visual marking on the covered portion 106 as a guide when inserting the ITE component 200 by inserting the ITE component 200 until the visual marking is no longer visible, at which point the user will know that the correct insertion depth of the ITE component 200 has been achieved.

Where FIGS. 6*a-e* and 7*a-d* show a top-down approach for providing the visual marking by using a hearing device with a connector according to some embodiments, FIGS. 8*a-c* show a bottom-up approach of the method according to some embodiments which can be used on a connector 100. FIG. 8*a* shows a hearing device arranged in the operational position, wherein the BTE component 300 is arranged behind the ear 400 of the user and the ITE component 200 is arranged at an insertion depth in the ear canal whereby the connector 100 has a covered portion 106 in the ear canal and an exposed portion outside the ear 400.

As shown in FIG. 8*a* the exposed portion 108 and the covered portion 106 may be located by visual inspection, e.g., by a hearing care professional. Subsequently, as shown in FIG. 8*b*, a visual marking is provided on the covered portion by adding a colored sticker onto the covered portion 106 so that the covered portion 106 can be distinguished from the exposed portion 108. The visual marking may also be provided by ink or other colored substances. Alternatively and/or additionally, a visual marking may be added to the exposed portion 108 or the boundary between the exposed portion 108 and the covered portion 106, which could also provide a visual marking making it possible for the user to distinguish the covered portion 106 from the exposed portion 108. In all embodiments it is however preferable that the covered portion 106 ends up in a bright color so that it is easy to see when the covered portion 106 is fully inserted into the ear canal, while it is preferable that the exposed portion 108 ends up being skin tone color, transparent, or translucent so that it is discrete and inconspicuous when the hearing device is arranged on the user.

It should be noted that the term "marking" is not limited to the examples described, and that the marking may be implemented using other techniques. For example, in other embodiments, the marking may be a marker that is physically coupled to the flexible member 110. The marker may be a ring (with an open or closed loop) configured to surround the flexible member 110. The ring may have an inner surface with adhesive configured to attach to a surface of the flexible member 110. Alternatively or additionally, the ring may have an inner dimension (cross-sectional dimension of the space surrounded by the ring) that is less than a cross-sectional dimension of the flexible member 110. This allows the ring to be frictionally coupled to the surface of the flexible member 110. In other embodiments, the marker implementing the visual marking may be a clip configured to clip against the flexible member 110, a tape (sticker) with adhesive for taping against the flexible member 110, a string for typing around the flexible member 110, a wire for wrapping around the flexible member 110, a coil configured to surround the flexible member 110, etc. In further embodiments, the marker may be a disk with an opening configured to accommodate a portion of the flexible member 110. The opening of the disk may be located in the center of the disk, and is configured to surround a portion of the flexible member 110. The disk may have a circular shape, an elliptical shape, a customized shape, or any other shapes.

As used in this specification, the term "removable visual marking" is not limited to marking that is itself removeable, or marking with material that is removeable, and such term may cover marking having a marking feature (e.g., color) that is changeable.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCE NUMBERS

100 Connector
102 Proximal end
104 Distal end
106 Covered portion
108 Exposed portion
110 Flexible member
120 BTE/Connector interface
130 Removable visual markings
200 ITE component
210 Securing element
300 BTE component
400 Ear
500 Light source

The invention claimed is:

1. A method of customizing a hearing device for a user, the method comprising:

providing a hearing device comprising a behind-the-ear (BTE) component, an in-the-ear (ITE) component, and a connector having a first end connected to the ITE component and a second end connected to the BTE component, the connector comprising a flexible member extending between the first end and the second end, the flexible member having a length; and after the BTE component is placed behind an ear of the user, and after the ITE component is inserted in an ear canal of the user at an insertion depth, providing a visual marking on the connector to distinguish a covered portion of the connector in the ear canal, from an exposed portion of the connector outside the ear canal.

2. The method of claim 1, wherein the connector comprises removable visual marking(s) arranged along at least a part of the length of the flexible member, and wherein the act of providing the visual marking comprises removing at least a portion of the removable visual marking(s) from the exposed portion, the covered portion, or a boundary that separates the exposed and the covered portions.

3. The method of claim 2, wherein the removable visual marking(s) comprises a dye, the dye being of a visible color, wherein the act of removing the removable visual marking(s) comprises curing the dye on the exposed portion, the covered portion, or the boundary that separates the exposed and the covered portions.

4. The method of claim 2, wherein the removable visual marking(s) comprises an ink, the ink being of a visible color, wherein the act of removing at least the portion of the removable visual marking(s) comprises removing at least some of the ink or changing the color of the ink at the exposed portion, the covered portion, or the boundary that separates the exposed and the covered portions.

5. The method of claim 2, wherein the removable visual marking(s) comprises multiple colored bands, wherein the act of removing at least the portion of the removable visual marking(s) comprises removing at least one of the colored bands from the exposed portion, the covered portion, or the boundary that separates the exposed and the covered portions.

6. The method of claim 1, wherein the act of providing the visual marking comprises adding a visible color to the flexible member.

7. The method of claim 6, wherein the act of adding the visible color comprises adding ink to the exposed portion, to the covered portion, or to a boundary that separates the exposed and the covered portions.

8. The method of claim 1, wherein the act of providing the visual marking comprises attaching a sticker to the exposed portion, to the covered portion, or to a boundary that separates the exposed and the covered portions.

9. The method of claim 1, wherein the act of providing the visual marking comprises coupling a marker to the exposed portion, to the covered portion, or to a boundary that separates the exposed and covered portions.

* * * * *